US006864919B2

(12) United States Patent
Hua (10) Patent No.: US 6,864,919 B2
(45) Date of Patent: Mar. 8, 2005

(54) IMAGE SENSOR WITH CORRELATED DOUBLE SAMPLING TECHNIQUE USING SWITCHED-CAPACITOR TECHNOLOGY

(75) Inventor: Paul Hua, Ottawa (CA)

(73) Assignee: Symagery Microsystems Inc., Ottawa (CA)

( * ) Notice: Subject to any disclaimer, the term of this patent is extended or adjusted under 35 U.S.C. 154(b) by 791 days.

(21) Appl. No.: 09/886,598

(22) Filed: Jun. 21, 2001

(65) Prior Publication Data

US 2002/0105012 A1 Aug. 8, 2002

Related U.S. Application Data

(60) Provisional application No. 60/256,491, filed on Dec. 20, 2000.

(51) Int. Cl.[7] ..................... H04N 5/217; H04N 5/335; H01L 27/00; H03M 1/12
(52) U.S. Cl. ................. 348/241; 348/308; 250/208.1; 341/172
(58) Field of Search ............................ 348/241, 242, 348/250, 251, 257, 294, 300, 302, 307, 308, 607, 615; 250/208.1; 341/172

(56) References Cited

U.S. PATENT DOCUMENTS

| | | | |
|---|---|---|---|
| 3,715,485 A | | 2/1973 | Weimer |
| 3,949,162 A | | 4/1976 | Malueg |
| 4,155,094 A | | 5/1979 | Ohba et al. |
| 5,796,431 A | | 8/1998 | Yonemoto |
| 5,872,470 A | * | 2/1999 | Mallinson et al. ............ 327/94 |
| 6,025,875 A | * | 2/2000 | Vu et al. ..................... 348/241 |
| 6,320,616 B1 | * | 11/2001 | Sauer ......................... 348/241 |
| 6,421,085 B1 | * | 7/2002 | Xu ............................. 348/308 |
| 6,433,632 B1 | * | 8/2002 | Nakamura et al. .......... 327/124 |
| 6,441,852 B1 | * | 8/2002 | Levine et al. ................ 348/308 |
| 6,697,108 B1 | * | 2/2004 | Chen et al. .................. 348/241 |
| 6,744,394 B2 | * | 6/2004 | Liu et al. ..................... 341/155 |
| 6,784,824 B1 | * | 8/2004 | Quinn ......................... 341/172 |

FOREIGN PATENT DOCUMENTS

| | | | | |
|---|---|---|---|---|
| WO | WO 98/24092 | * | 6/1998 | ........... G11C/27/02 |
| WO | 99/46929 | | 9/1999 | |
| WO | 00/62530 | | 10/2000 | |

OTHER PUBLICATIONS

Yonemoto et al.; "A Numerical Analysis of a CMOS Image Sensor with a Simple Fixed–Pattern–Noise–Reduction Technology"; May 2002; IEEE Transactions on Electron Devices; vol. 49, No. 5; 746–753.*
Huang et al.; "Reduced Nonlinear Distortion in Circuits with Correlated Double Sampling"; 1996; IEEE.*

* cited by examiner

Primary Examiner—Wendy R. Garber
Assistant Examiner—John Villecco
(74) Attorney, Agent, or Firm—Pearne & Gordon LLP (57) ABSTRACT

An output signal of an image sensor pixel, which substantially avoids fixed pattern noise contributed by the readout circuitry, is provided. The apparatus, which is used to provide an output signal that is a function of the difference between two sample signals $V_{S1}$ and $V_{S2}$, includes first and second capacitor elements that are coupled together at a common terminal. A reference voltage $V_{REF}$ is first applied to the capacitor elements, then a first sample signal $V_{S1}$ from the image sensor pixel is applied to the first capacitor element producing a charge that is transferred to the second capacitor element. A second sample signal $V_{S2}$ from the image sensor pixel is then applied to the first capacitor element producing a charge that is also transferred to the first capacitor element such that $V_O = V_{S2} - V_{S1} + V_{REF}$.

23 Claims, 7 Drawing Sheets

IMAGE SENSOR WITH CORRELATED DOUBLE SAMPLING TECHNIQUE USING SWITCHED-CAPACITOR TECHNOLOGY

This application claims the benefit of U.S. Provisional Patent Application Ser. No. 60/256,491 filed on Dec. 20, 2000.

FIELD OF THE INVENTION

The invention relates generally to image scanning devices and more particularly to CMOS image sensors.

BACKGROUND OF THE INVENTION

As telecommunication devices and personal digital assistants increase in popularity so do their demand for new and interesting features. Such features, which may include digital video communication or imbedded image capture apparatus, will require the use of a transducer with specifications compatible with the devices in question i.e. low power consumption, reduced size, high resolution, high speed.

Charged coupled devices (CCD) of the type disclosed in U.S. Pat. No. 3,715,485 that issued to Weimer on Feb. 6, 1973, are presently the most significant commercial IC transducer used to represent an image as an electrical signal. Complementary Metal Oxide Semiconductor Field Effect Transistor (CMOS) image sensors and CCD sensors were developed around the same time, however it was found when they were initially created, that CMOS image sensors had too poor a signal to noise ratio to be competitive. An elementary example of a CMOS imager is described in U.S. Pat. No. 4,155,094 which issued to Ohba et al on May 15, 1979.

However, the CMOS sensor does have certain advantages over the CCD sensor. The CMOS image sensor has the ability to integrate companion circuitry such as digital signal processing circuitry onto the same substrate as the image sensor, allowing the reduction in size of the amount of peripheral circuitry needed to interface with the image sensor. Further, integrating processing and acquisition circuitry allows designers to take advantage of a wider datapath between these stages.

As well, CMOS image sensors can be manufactured using current standard CMOS fabrication techniques, giving it a significant cost advantage over using the alternative CCD image sensor which requires special manufacturing techniques. CMOS is a less expensive technology employing fewer mask layers and is a more mature fabrication technology with greater commercial volume. CCD technology complexity causes lower fabrication yield.

The noise disadvantage of CMOS imagers has been addressed at various stages in the device; in particular there was the development of correlated double sampling (CDS), which is described in U.S. Pat. No. 3,949,162 that issued to Malueg on Apr. 6, 1976.

CDS is used when reading out information from the image pixels. This operation is performed by first reading out the level of the charge stored on the pixel element and storing it on a capacitor, and then by reading out the charge stored on the pixel element by a reset voltage and storing it on a capacitor. These two signals are then combined to form a noise-reduced signal representative of the pixel signal. This process reduces most of the noise associated with an active pixel sensor (APS), such as dark current noise, kT/C noise from the floating diffusion node, the fixed pattern noise (FPN) from the MOS transistor threshold voltage differences inside the pixel, and the low-frequency noise generated by the source-follower MOS transistors. However, this process does not reduce the column-wise FPN contributed by capacitor mismatching in the column readout circuitry.

Therefore, there is a need for a process and apparatus that effectively eliminates the fixed pattern noise contributed by the column readout circuitry.

SUMMARY OF THE INVENTION

The invention is directed to a method and apparatus for processing an output signal of an image sensor pixel.

The method comprises applying a reference voltage $V_{REF}$ to first and second capacitor elements that are coupled together at a common terminal, applying a first sample signal $V_{S1}$ from the image sensor pixel to the first capacitor element placing a charge on it, transferring the charge from the first capacitor element to the second capacitor element, applying a second sample signal $V_{S2}$ from the image sensor pixel to the first capacitor element placing a charge on it, and transferring the charge from the second capacitor element to the first capacitor element so as to provide an output signal that is a function of the difference between the second sample signal $V_{S2}$ and the first sample signal $V_{S1}$.

In accordance with another aspect of this invention, an operational amplifier is coupled to the common terminal between the first and second capacitor elements, and the output of the operational amplifier is $V_O = V_{S2} - V_{S1} + V_{REF}$. In addition, $V_{S1}$ is a sample voltage proportional to light intensity on the pixel and $V_{S2}$ is a pixel reset voltage.

With regard to a further aspect of the present invention, the readout circuitry for image sensor pixels comprises a first capacitor element having first and second terminals, a second capacitor element having first and second terminals, an amplifier having an input terminal and an output terminal with the input terminal connected to the second terminals of the first and second capacitor elements. The readout circuitry further includes a first switch adapted to be connected between a reference voltage and the first terminal of the first capacitor element, a second switch adapted to be connected between a pixel and the first terminal of the first capacitor element, a third switch adapted to be connected between a reference voltage and the first terminal of the second capacitor element, a fourth switch connected between the amplifier input terminal and the output terminal, a fifth switch connected between the second terminal of the second capacitor element and the amplifier output terminal, and a sixth switch connected between the first terminal of the first capacitor element and the amplifier output terminal.

Regarding a further aspect of this invention, the readout circuitry further includes a controller for controlling the first to sixth switches. In particular the controller is adapted to close the first switch, the third switch and the fourth switch simultaneously, to close the second switch and the fifth switch simultaneously, to close the second switch and the fourth switch simultaneously, and then to close the third switch and the sixth switch simultaneously.

In accordance with a specific aspect of this invention, the amplifier is a CMOS operational amplifier with a reference terminal for connection to a reference voltage and all of the switches are CMOS transistors.

In accordance with another aspect of this invention, the method of operating the readout circuit outlined above comprises the following sequential steps: opening all of the switches, closing the first, third and fourth switches, opening all of the switches, closing the second and fifth switches, opening the fifth switch and closing the fourth switch, opening all of the switches, closing the third and sixth switches, and reading the output voltage Vo on the operational amplifier output terminal.

With the reference voltages being equal to $V_{REF}$, and the pixel sample signals being $V_{S1}$ and $V_{S2}$, then $V_O=V_{S2}-V_{S1}+V_{REF}$. With $V_{S1}$ being a sample voltage proportional to light intensity on the pixel and $V_{S2}$ being a pixel reset voltage, the output Vo is a function of the light intensity on the pixel with no reliance on the values of the first and second capacitor elements.

Aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
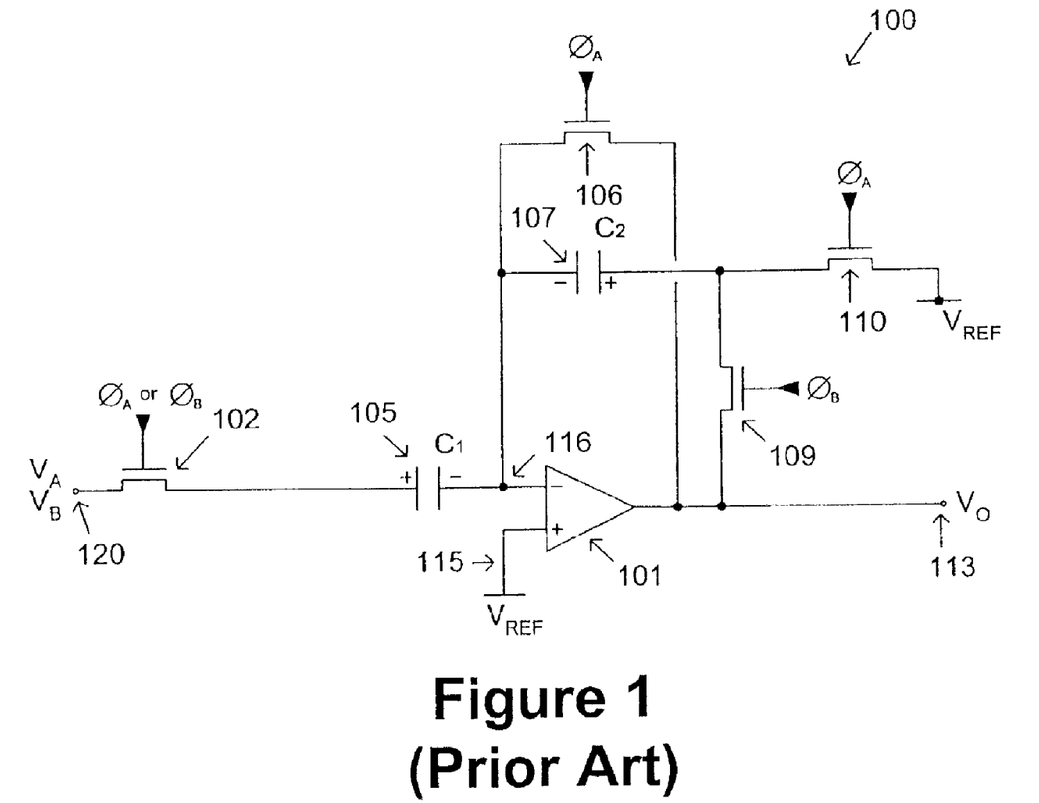
FIG. 1 illustrates a basic prior art correlated double sampling (CDS) column readout circuitry.

A basic correlated double sampling (CDS) column readout circuitry 100 is shown in FIG. 1. Circuitry 100 includes an operational amplifier 101, capacitors 105 and 107 and transistors 102, 107, 109 and 110. The column bit-line is connected via line 120 to the source of transistor 102. From this bit-line the circuit 100 will successively sample a first active pixel charge $V_A$ and then a reset pixel charge $V_B$ in the following manner.

During a first period, a high value signal $Ø_A$ is applied to the gates of transistors 102, 106, 110 rendering them conductive. Transistor 109 is non-conducting due to a low signal on its gate. During this period, the feedback capacitor 107 is charged to the op amp 101 offset voltage $V_{OS1}$, and the input capacitor 105 is charged to the difference between the input pixel voltage $V_A$ and the reference voltage $V_{REF}$ on line 115 minus the op amp offset voltage $V_{OS1}$. Thus the charge $Q_1$ on capacitor 105 is such that:

$$Q_1=[V_A-(V_{REF}-V_{OS1})]C_1$$

During a second period, transistors 106 and 110 are placed in non-conducting mode, and transistors 102 and 109 are placed in conducting mode by applying a high value signal $Ø_B$ to the gates of transistors 102 and 109. This places the op-amp 101 in its charge feedback amplification configuration. Concurrently, $V_B$ is applied on line 120. Provided the capacitors 105 and 107 are matched in capacitance, the offset voltage $V_{OS1}$ stored on the feedback capacitor 107 compensates for the op amp voltage offset $V_{OS2}$, and the difference in input voltages is propagated to the output terminal 113 as $V_O$, where $$V_O=V_{REF}+V_A-V_B.$$

However, if the capacitors 105 and 107 are mismatched the voltage differential $(V_A-V_B)$ will be amplified and the stored op-amp offset voltage $V_{OS1}$ will not cancel the amplified effects of the offset voltage $V_{OS2}$ during the second sampling. This produces the column-wise FPN due to capacitor mismatching.

Figure 2:
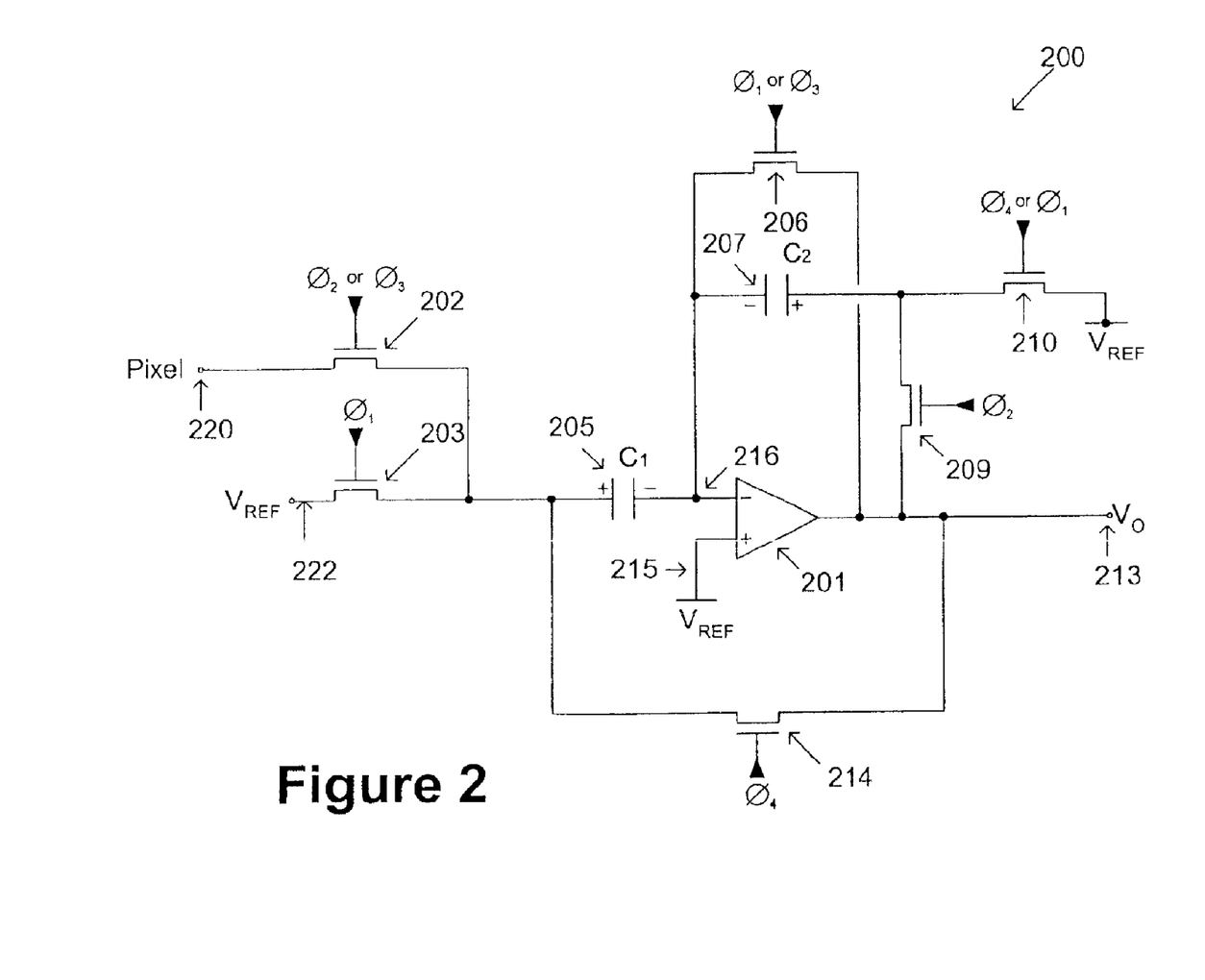
FIG. 2 illustrates a column readout circuitry in accordance with the present invention.
Figure 3:
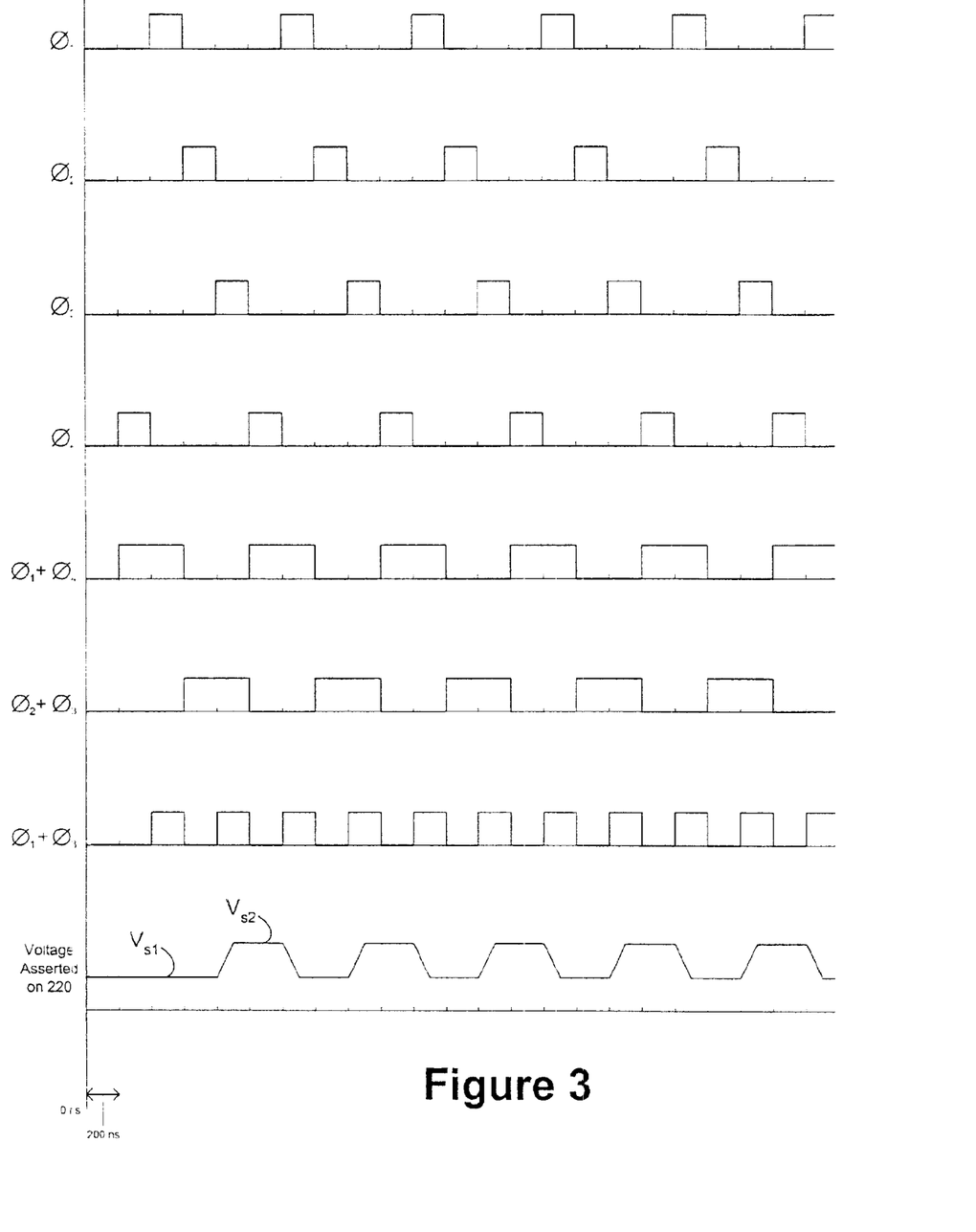
FIG. 3 illustrates the control signals for the column readout circuitry.

This problem is resolved in accordance with the present invention by column readout circuitry 200, which is illustrated in FIG. 2 with corresponding clocking signals for the readout circuitry shown in FIG. 3. FIG. 3 illustrates clocking signals $Ø_1$, $Ø_2$, $Ø_3$ and $Ø_4$. The combined clocking signals $Ø_1+Ø_4$, $Ø_2+Ø_3$, as well as $Ø_1+Ø_3$ that are applied to transistors 210, 202 and 206 respectively are also shown. The sample signals $V_{S1}$ and $V_{S2}$ are also shown on FIG. 3. Circuitry 200 comprises several switching devices such as NMOS transistors 202, 203, 206, 209, 210 and 214 for controlling the flow of charge through the readout circuitry 200, two capacitor elements 205 and 207 for the storage of the charge readouts of the pixel, and an operational amplifier 201 for amplifying the eventual readout value. In the drawing and subsequent description, the values $C_1$ and $C_2$ of capacitors 205 and 207 respectively are not equal, due to differences that are inherent in the process of creating an integrated circuit, known in this case as process mismatch. It is the intention of the invention to effectively render these differences irrelevant by removing the reliance of the amplifier 201 on the values of capacitors 205 and 207.

Figure 4:
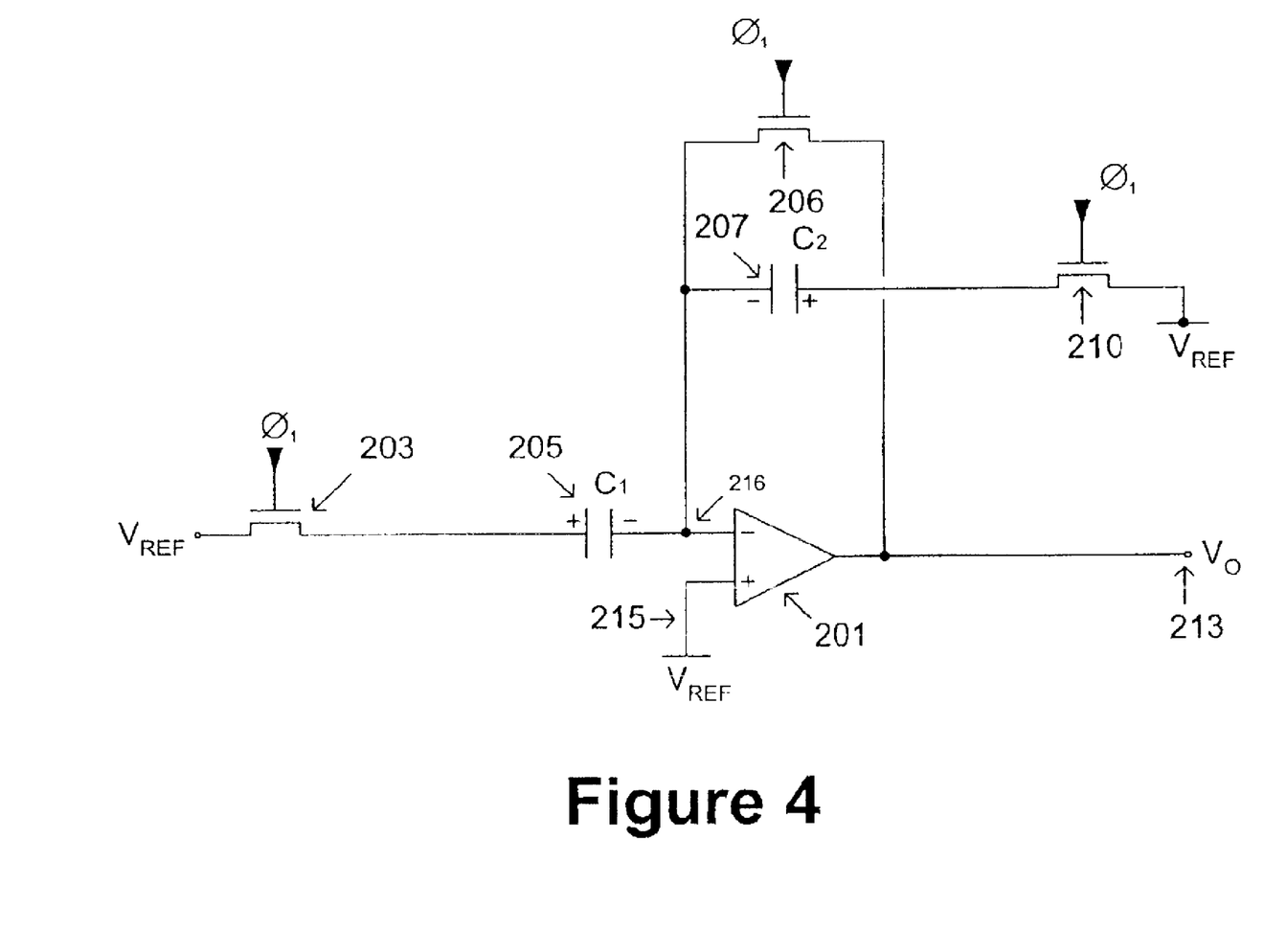
FIGS. 4 to 7 schematically exemplify the four steps for the readout process.

In the first or reset step of the readout, as illustrated in FIG. 4, the column readout circuitry 200 is reset by setting Ø1 to a high logic level on the gates of transistors 203, 206, and 210 placing them in a conducting state. All other transistors are left in a non-conducting state. This connects the reference voltage $V_{REF}$ to the anode of the first capacitor element 205 and to the anode of the second capacitor 207. This step sets the charge on the capacitors 205 and 207 to the offset voltage $V_{OS}$ of the operational amplifier 201 and the output $V_O$ to the reference voltage $V_{REF}$ less the offset voltage $V_{OS}$. To summarize:

$$V_{C1}=V_{OS} \quad \text{(Equation 1.1)}$$

$$V_{C2}=V_{OS} \quad \text{(Equation 1.2)}$$

$$V_O=V_{REF}-V_{OS} \quad \text{(Equation 1.3)}$$

Figure 5:
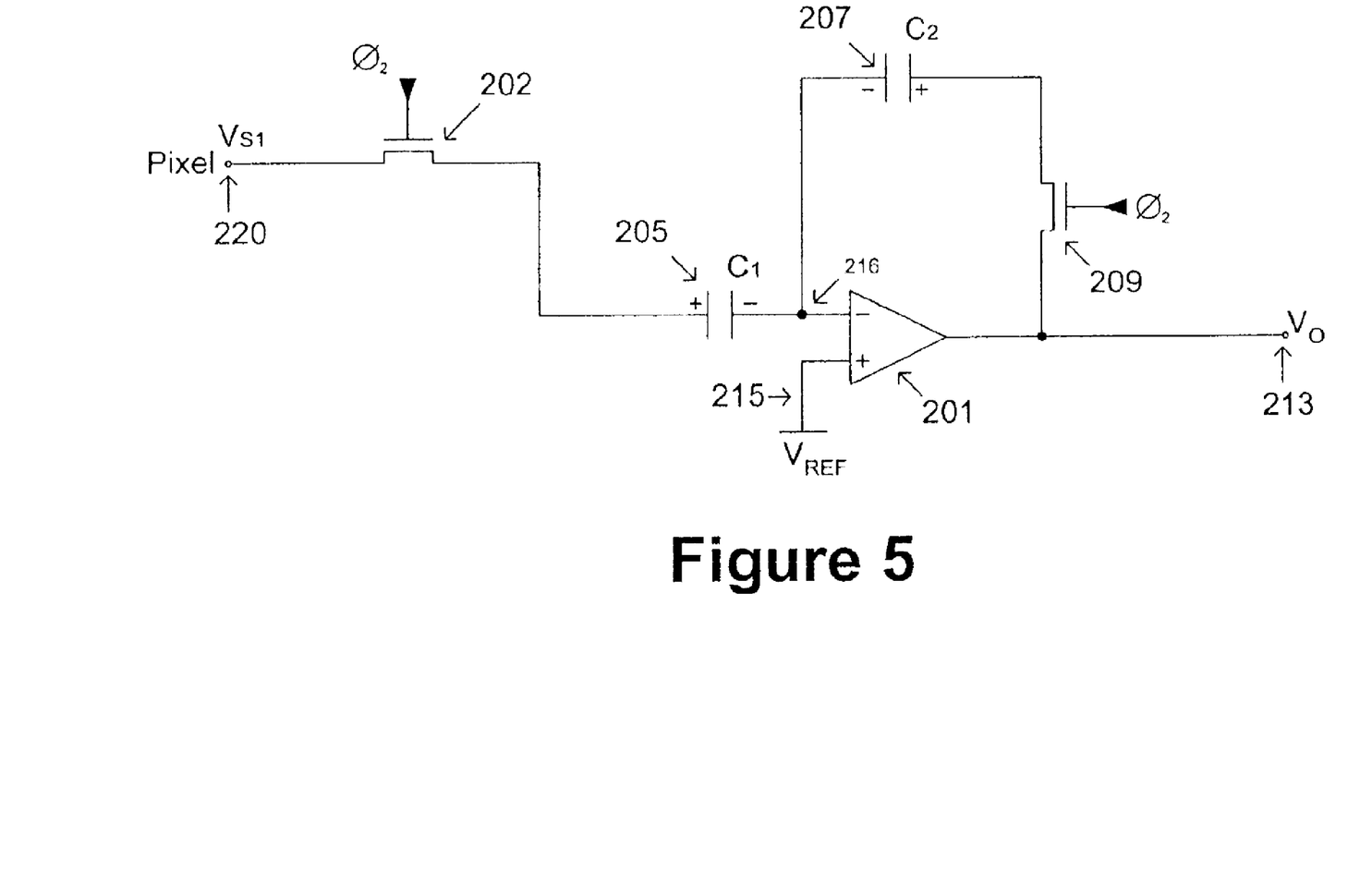

The second step, as illustrated in FIG. 5 is to acquire the first sample signal $V_{S1}$. This is accomplished by setting $Ø_1$ back to a logic low level, and raising $Ø_2$ to a logic high level. When $Ø_2$ is applied to the gates of transistors 202 and 209, they are placed in a conductive state. All other transistors are in a non-conducting state. The line 220 is connected, through the column line, to the pixel element, which has the first sample voltage $V_{S1}$.

The anode of the first capacitor 205 had been precharged to $V_{REF}$, with the introduction of $V_{S1}$ onto this node, a charge difference has been created. Due to the law of conservation of charge, there can be no net change in charge between the two capacitors 205 and 207. In other words:

$$Q_1+Q_2=K \quad \text{(Equation 2.1)}$$

where Q is the charge associated with a capacitor,
ΔQ is the charge difference on a capacitor, and
K is a constant
Or, $$\Delta Q_1+\Delta Q_2=0$$

From the law of conservation of charge, the equations associated with the circuit can now be determined.

$$V_{C1}=V_{S1}-(V_{REF}-V_{OS}) \quad \text{(Equation 2.2)}$$

From the law of conservation of charge, $$\Delta V_{C1} = -(V_{REF} - V_{S1})$$

$$\Delta Q_1 = -(V_{REF} - V_{S1}) \times C_1$$

Subsequently, $$\Delta Q_2 = -\Delta Q_1$$

$$\Delta Q_2 = +(V_{REF} - V_{S1}) \times C_1$$

And, $$V_{C2} = V_{C2OLD} + \Delta Q_2 / C_2$$

Therefore, $$V_{C2} = V_{OS} + (C_1/C_2) \times (V_{REF} - V_{S1}) \quad \text{(Equation 2.3)}$$

As well, since, $$V_{C2} = V_O - (V_{REF} - V_{OS})$$

It can be said that, $$V_O = V_{REF} + (C_1/C_2) \times (V_{REF} - V_{S1}) \quad \text{(Equation 2.4)}$$

Essentially, the circuit has completed its first sample of the pixel data. This was accomplished by placing the first sample signal onto the first capacitor 205 and then transferring the captured first pixel data into the second capacitor 207. This allows circuit space on the first capacitor 205, with which to capture the second sample $V_{S2}$ of pixel data.

Figure 6:
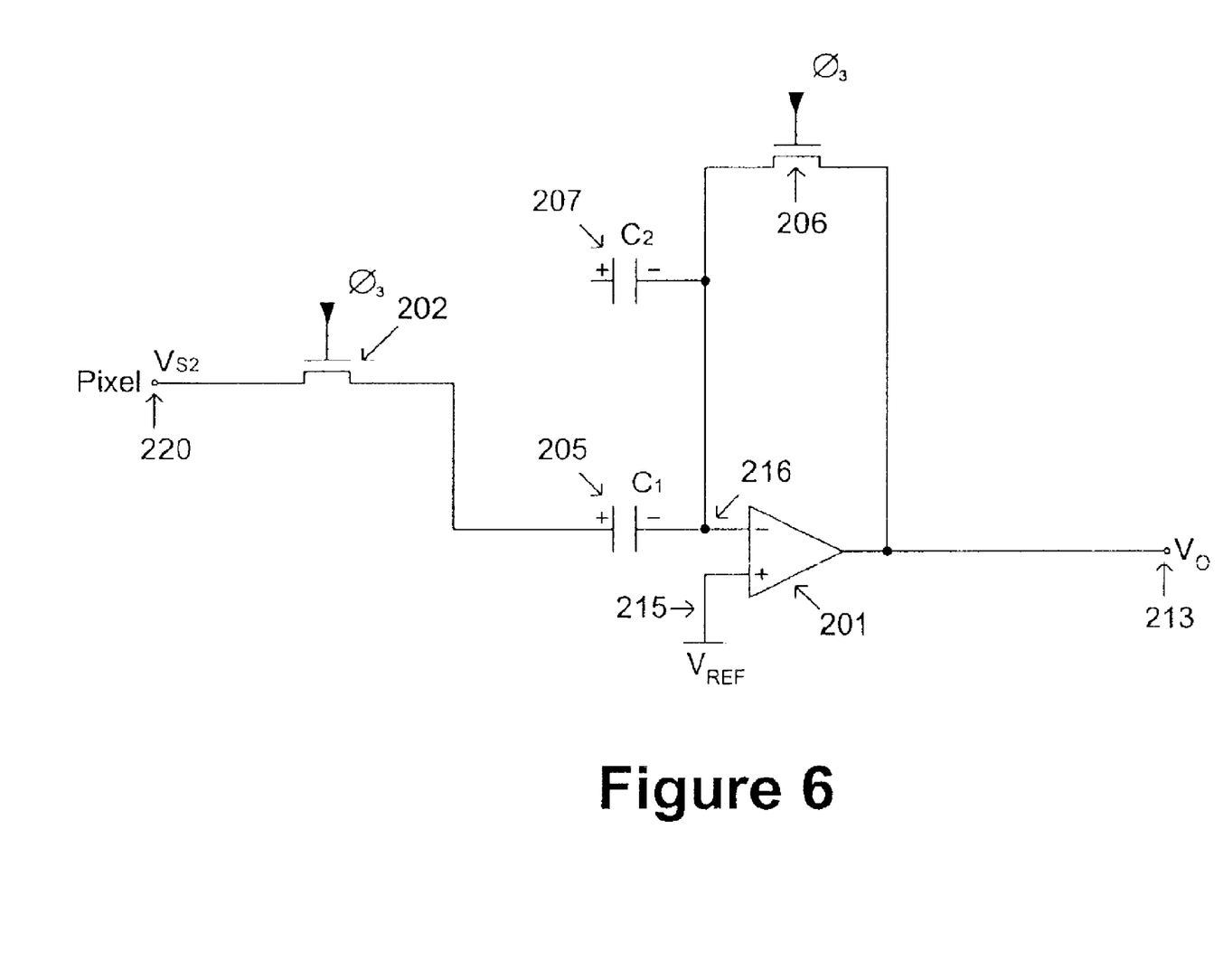

The third step comprising the acquisition of the second sample signal $V_{S2}$, as illustrated in FIG. 6, is done by setting the $\emptyset_2$ signal back to a logic low level, and setting the $\emptyset_3$ signal to a high logic level. This places transistors 202 and 206 in a conducting state, and leaves all the other transistors in the circuit 200 in a non-conducting state.

This allows the second sample signal $V_{S2}$ from line 220 to be placed on the anode of the first capacitor 205. The voltage across the capacitor 205 has the following value, $$V_{C1} = V_{S2} - (V_{REF} - V_{OS}) \quad \text{(Equation 3.1)}$$

As well since the output of the op-amp 201 has now been tied to the inverting input 216 of the op-amp 201, $$V_O = V_{REF} - V_{OS} \quad \text{(Equation 3.2)}$$

In addition, the second capacitor element 207 has had its anode disconnected from any influencing potential, and its cathode is maintained at the same voltage as the previous step, allowing it to maintain the charge of the previous step. So, $$V_{C2} = V_{OS} + (C_1/C_2) \times (V_{REF} - V_{S1}) \quad \text{(Equation 3.3)}$$

Essentially, the first sample signal $V_{S1}$ was captured and stored on the second capacitor 207. Then the second sample signal $V_{S2}$ was captured and stored on the first capacitor element 205. This leaves only the step of evaluation of the two pixel-data values.

Figure 7:
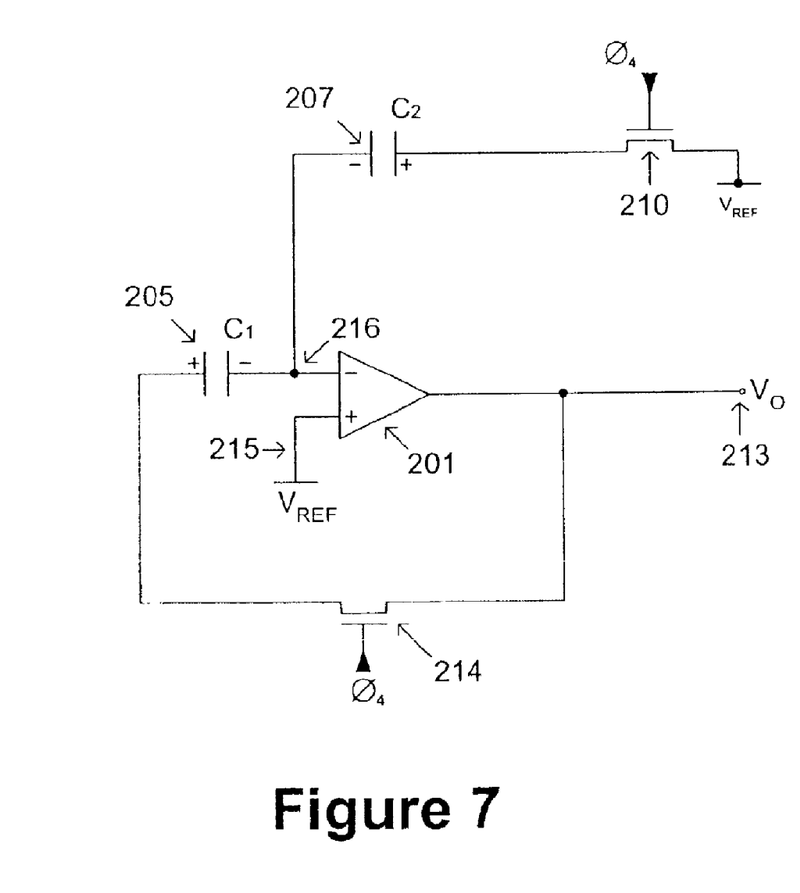

The fourth step concerning pixel-data evaluation, as illustrated in FIG. 7, is accomplished by setting $\emptyset_3$ back to a logic low level and bringing $\emptyset_4$ to a logic high level. The $\emptyset_4$ clock signal controls transistors 214 and 210, setting $\emptyset_4$ high on the gates of transistors 214 and 210 places transistors 214 and 210 in a conducting state, while leaving all other transistors in a non-conducting state.

The anode of capacitor 207 is now connected to $V_{REF}$, and its cathode is now connected to $(V_{REF} - V_{OS})$, due to the virtual short circuit between the inputs of the op-amp 201. This establishes a charge on capacitor 207 of:

$$Q_2 = V_{REF} - (V_{REF} - V_{OS}) \times C_2$$

Therefore, $$V_{C2} = V_{OS} \quad \text{(Equation 4.1)}$$

According to the law of conservation of charge, $$\Delta Q_1 + \Delta Q_2 = 0$$

Therefore, $$\Delta V_{C2} = V_{C2NEW} - V_{C2OLD}$$

$$\Delta V_{C2} = V_{OS} - [(C_1/C_2) \times (V_{REF} - V_{S1}) + V_{OS}]$$

$$= -(C_1/C_2) \times (V_{REF} - V_{S1})$$

$$\Delta Q_2 = C_2 \times \Delta V_{C2}$$

$$= -C_1 \times (V_{REF} - V_{S1})$$

And since, $$\Delta Q_1 = -\Delta Q_2$$

Then, $$\Delta V_{C1} = \Delta Q_1 / C_1 \quad \text{(Equation 4.2)}$$

$$= V_{REF} - V_{S1}$$

$$V_{C1} = V_{C1OLD} + \Delta V_{C1}$$

$$= (V_{S2} - (V_{REF} - V_{OS})) + (V_{REF} - V_{S1})$$

$$V_{C1} = V_{S2} - V_{S1} + V_{OS}$$

It can also be said that, $$V_{C1} = V_O - (V_{REF} - V_{OS})$$

Therefore, $$V_O = V_{C1} + (V_{REF} - V_{OS})$$

So, it can be determined that, $$V_O = V_{S2} - V_{S1} + V_{REF} \quad \text{(Equation 4.3)}$$

In terms of what has occurred, the charge stored in the second capacitor 207 has been transferred back to the first capacitor 205 and left an evaluation at the output $V_O$ of the circuit 200. An evaluation that is independent of the values of the capacitors 205 and 207 used in the amplifier, thus effectively eliminating the noise associated with the capacitors 205 and 207 due to process mismatch. In addition, the present invention is equally applicable even if the difference between the capacitors 205 and 207 is small or nonexistent.

Thus in the above details has been described a unique and useful column readout circuit for a CMOS imager. However, the invention is not necessarily limited to CMOS imagers, the invention could be used in any circumstance where an evaluation of two electrical signals must be performed without noise from the readout circuitry.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of processing an output signal of an image sensor pixel in readout circuitry having a first capacitor element coupled to a second capacitor element, comprising the steps of:
   a. applying a reference voltage $V_{REF}$ to the first and the second capacitor elements;
   b. applying a first sample signal $V_{S1}$ from the image sensor pixel to the first capacitor element placing a charge on the first capacitor element;
   c. transferring the charge from the first capacitor element to the second capacitor element;
   d. applying a second sample signal $V_{S2}$ from the image sensor pixel to the first capacitor element placing a charge on the first capacitor element; and
   e. transferring the charge from the second capacitor element to the first capacitor element so as to provide an output signal that is a function of the difference between the second sample signal $V_{S2}$ and the first sample signal $V_{S1}$.

2. A method as claimed in claim 1 wherein step e. comprises transferring the charge from the second capacitor element to the first capacitor element so as to provide an output signal $V_O$ where $V_O=V_{S2}-V_{S1}+V_{REF}$.

3. A method as claimed in claim 1 wherein $V_{S1}$ is a sample voltage proportional to light intensity on the pixel and $V_{S2}$ is a pixel reset voltage.

4. A method of processing an output signal of an image sensor pixel in readout circuitry having an operational amplifier with an input terminal, a reference terminal and an output terminal, a first capacitor element having first and second terminals with the second terminal coupled to the input terminal and a second capacitor element having first and second terminals with the second terminal coupled to the input terminal, comprising the steps of:
   a. connecting the operational amplifier reference terminal to a reference voltage $V_{REF}$;
   b. applying the reference voltage $V_{REF}$ to the first terminals of the first and the second capacitor elements;
   c. applying a first sample signal $V_{S1}$ from the image sensor pixel to the first terminal of the first capacitor element placing a charge on the first capacitor element;
   d. transferring the charge from the first capacitor element to the second capacitor element;
   e. applying a second sample signal $V_{S2}$ from the image sensor pixel to the first terminal of the first capacitor element placing a charge on the first capacitor element; and
   f. transferring the charge from the second capacitor element to the first capacitor element so as to provide an output signal $V_O$ on the operational amplifier output terminal that is a function of the difference between the second sample signal $V_{S2}$ and the first sample signal $V_{S1}$.

5. A method as claimed in claim 4 wherein $V_O=V_{S2}-V_{S1}+V_{REF}$.

6. A method as claimed in claim 4 wherein $V_{S1}$ is a sample voltage proportional to light intensity on the pixel and $V_{S2}$ is a pixel reset voltage.

7. A method of processing an output signal of an image sensor pixel in readout circuitry having an operational amplifier with an input terminal, a reference terminal connected to a first reference voltage and an output terminal, a first capacitor element having first and second terminals with the second terminal coupled to the input terminal, a second capacitor element having first and second terminals with the second terminal coupled to the input terminal, first switch means adapted to be connected between a second reference voltage and the first capacitor element first terminal, second switch means adapted to be connected between a pixel and the first capacitor element first terminal, third switch means adapted to be connected between a third reference voltage and the second capacitor element first terminal; fourth switch means connected between the operational amplifier input terminal and the output terminal; fifth switch means connected between the second capacitor element second terminal and the operational amplifier output terminal; and sixth switch means connected between the first capacitor element first terminal and the operational amplifier output terminal, comprising the steps of:
   a. opening all of the switch means;
   b. closing the first, third and fourth switch means;
   c. opening all of the switch means;
   d. closing the second and fifth switch means;
   e. opening the fifth switch means and closing the fourth switch means;
   f. opening all of the switch means;
   g. closing the third and sixth switch means;
   h. reading the output voltage Vo on the operational amplifier output terminal.

8. A method as claimed in claim 7 wherein the first, second and third reference voltages are equal to $V_{REF}$.

9. A method as claimed in claim 8 wherein step d. includes applying a pixel sample signal $V_{S1}$ to the first capacitor element.

10. A method as claimed in claim 9 wherein step e. includes applying a pixel sample signal $V_{S2}$ to the first capacitor element.

11. A method as claimed in claim 10 wherein $V_O=V_{S2}-V_{S1}+V_{REF}$.

12. A method as claimed in claim 11 wherein $V_{S1}$ is a sample voltage proportional to light intensity on the pixel and $V_{S2}$ is a pixel reset voltage.

13. Readout circuitry for image sensor pixels comprising:
   first capacitor means having first and a second terminals;
   second capacitor means having first and a second terminals;
   amplifier means having an input terminal and an output terminal, wherein the second terminals of the first and second capacitor means are connected to the amplifier means input terminal;
   first switch means connected to the first capacitor means first terminal;
   second switch means connected to the second capacitor means first terminal;
   third switch means connected between the amplifier means input terminal and output terminal;
   fourth switch means connected between the second capacitor means second terminal and the amplifier means output terminal; and
   fifth switch means connected between the first capacitor means first terminal and the amplifier means output terminal.

14. Readout circuitry as claimed in claim 13 wherein the amplifier means further includes a reference terminal adapted to be connected to a reference voltage $V_{REF}$.

15. Readout circuitry as claimed in claim 14 wherein the first switch means comprises:

first coupling means adapted to couple the first capacitor first terminal to a reference voltage $V_{REF}$; and second coupling means adapted to couple the first capacitor first terminal to a pixel.

16. Readout circuitry as claimed in claim 15 wherein the second switch means is adapted to couple the second capacitor means first terminal to a reference voltage $V_{REF}$.

17. Readout circuitry as claimed in claim 16 comprising means for controlling the first and second coupling means and the second, third, fourth and fifth switch means.

18. Readout circuitry as claimed in claim 17 wherein the control means is adapted to close the second switch means, the third switch means and the first coupling means substantially simultaneously.

19. Readout circuitry as claimed in claim 18 wherein the control means is adapted to close the fourth switch means and the second coupling means substantially simultaneously.

20. Readout circuitry as claimed in claim 19 wherein the control means is adapted to close the third switch means and the second coupling means substantially simultaneously.

21. Readout circuitry as claimed in claim 20 wherein the control means is adapted to close the second switch means and the fifth switch means substantially simultaneously.

22. Readout circuitry as claimed in claim 16 wherein the first and second coupling means and the second, third, fourth and fifth switch means are transistors.

23. Readout circuitry as claimed in claim 16 the first and second coupling means and the second, third, fourth and fifth switch means are CMOS transistors.

* * * * *